United States Patent [19]

Lutz et al.

[11] 3,974,339
[45] Aug. 10, 1976

[54] METHOD OF TRANSMITTING DIGITAL INFORMATION IN A TIME-DIVISION MULTIPLEX TELECOMMUNICATION NETWORK

[75] Inventors: Karl-Anton Lutz, Munich; Eberhard Knorpp, Gauting, both of Germany

[73] Assignee: Siemens Aktiengesellschaft, Berlin & Munich, Germany

[22] Filed: Sept. 17, 1974

[21] Appl. No.: 506,867

[30]  Foreign Application Priority Data

Sept. 18, 1973  Germany............... 2346984

[52] U.S. Cl. .................. 179/15 BS; 179/15 AA
[51] Int. Cl.² ........................................ H04Q 5/18
[58] Field of Search ........ 179/15 AA, 15 AT, 15 A, 179/15 BS; 178/69.5 R

[56]  References Cited
UNITED STATES PATENTS 3,832,492  8/1974  Charransol ................ 179/15 AT

*Primary Examiner*—William C. Cooper
*Assistant Examiner*—Joseph Popek

[57]  ABSTRACT

A method for transmitting digital data in a time-division multiplex telecommunications network over subscriber lines connecting digital subscriber stations to a subscriber concentrator is described. Transfers of data occur over two wire subscriber lines in both transmission directions in a time interleaved manner alternatively and in the form of bits. The bits are formed to have a duration such that in conjunction with the distance/velocity lags of transmission over subscriber lines they almost completely use the sampling intervals or pluralities thereof. This forms the basis for transmisson over time division multiplex paths going out from the subscriber concentrator and coming in thereat, except for a tolerance time interval allowed for the period of the clock generators determining the bit rate in the subscriber sets relative to the period of the exchange clock generator determining the exchange clock rate in the exchange connected to the subscriber concentrator.

4 Claims, 3 Drawing Figures

METHOD OF TRANSMITTING DIGITAL INFORMATION IN A TIME-DIVISION MULTIPLEX TELECOMMUNICATION NETWORK

BACKGROUND OF THE INVENTION

The invention relates to a method of transmitting digital information in a time-division multiplex telecommunications network over subscriber lines connecting the digitally operating subscriber sets to a subscriber concentrator.

The digitization of time-division multiplex telecommunications networks, insofar as the subscriber sets are concerned results, among other things, in a simpler structure for the subscriber concentrators. It is, therefore, possible to connect a larger number of subscribers to a terminal exchange than the number of time slots available for the retransmission over time-division multiplex paths.

As a rule, four-wire lines are needed for transmitting digital information, in contradistinction to the transmission in time-division multiplex telecommunications networks in which the units of information appear in the form of pulse-amplitude-modulated pulses. However, this means that additional expenditures are required because of the necessary four-wire construction of the subscriber lines connecting the subscriber sets to the subscriber concentrator. Of course, this additional cost would cancel out the advantage of digitization of the subscriber sets mentioned hereinabove.

Pulse-amplitude-modulated pulses of a time-division multiplex telecommunications network can be transmitted over two-wire lines. This is due to the fact that in the case of simultaneous transmission of information in both directions in the form of a charge exchange between the capacitors contained in interconnected subsets, there is no danger that the units of information will interfere with one another. This is not the case when units of information are represented by means of digital values.

Nevertheless, even in the case of transmission of pulse-amplitude-modulated pulses of a time-division multiplex telecommunications system, it is, likewise, old in the art to carry out the transmission in both directions in a time-interleaved arrangement, because in a prior art switching arrangement for connecting a four-wire line to a two-wire time-division multiplex path (West German Examined Patent Application No. 1,287,161), the samples to be sent in both directions of transmission to the time-division multiplex path are divided into two equal parts and transmitted immediately one after the other, so as to use the time-division multiplex path only for the shortest time possible.

In order to again obtain samples having the original length, pulse stretching elements are inserted into the receiving branches of the four-wire lines connected to the two-wire time-division multiplex path. Apart from the fact that the pulse stretching elements constitute an additional electrical outlay, the reduction of the pulse duration of the pulses transmitted over the two-wire line results in deterioration as far as the damping and distortion factors are concerned which, inasmuch as the time-division multiplex path is the multiplex bus bar of a time-division multiplex exchange, is acceptable because of the short length thereof.

In connection with the transmission over subscriber lines between a concentrator and the subscriber sets which, in certain circumstances, can be as long as 10 kilometers, and in connection with the pulse length that is customary for the transmission of digital information, the bits of a code word used for pulse-code modulation are approximately only half as long as the samples used for pulse-amplitude-modulation. Such halving of the transmission intervals would lead to rather significant deteriorations of the transmission quality.

It is an object of the invention to provide a method for transmitting digital information of a time-division multiplex network over subscriber lines connecting the digitally operating subscriber sets to a subscriber concentrator, which enables one to run the subscriber lines on a two-wire basis, thereby achieving such favorable transmission characteristics that additional components, such as regenerators for the subscriber lines, can be dispensed with.

SUMMARY OF THE INVENTION

In accordance with the invention, the foregoing and other objects are achieved in that the units of information are transferred over two-wire subscriber lines in both directions of transmission in a time-interleaved arrangement alternatively and in the form of information bits having such duration that in conjunction with the information distance/velocity lag over the subscriber lines they almost completely use the sampling intervals, or a plurality thereof. This forms the basis for transmission over the time-division multiplex paths going out from the subscriber concentrator and coming in thereat, except for a tolerance time interval allowed for the period of the clock generators fixing the bit rate in the subscriber sets referred to the period of the exchange clock generator determining the exchange clock in the terminal exchange connected to the subscriber concentrator.

In addition to the advantages enumerated above, the method according to the invention is further advantageous in that a generator of relatively minor quality can be used as a clock generator in the subscriber set, which need not be synchronized with the exchange clock generator.

According to a further embodiment of the method according to the invention, in case of delta modulation of the information, the information bits are transmitted as constituent parts of bytes, wherein each byte comprises a plurality of information bits. These bits correspond to information sampling values occurring in the same information time slot in direct time sequence, and the alternation of which for both directions of transmission occurs within a corresponding plurality of sampling intervals. In this way, it is possible to use the method according to the invention even in the case of delta modulation of the information without having to put up with restrictions due to the length of the subscriber lines because of the distance/velocity lags referred to the conditions in the case of pulse-code modulation.

According to another form of the method according to the invention, the information bits are transmitted in the form of potentials that are positive and negative relative to a reference potential. This has the advantage that it obviates the need for identifying the beginning of the code words by an extra signal bit.

BRIEF DESCRIPTION OF THE DRAWINGS

The principles of the invention will be more readily understood by reference to the description of a preferred embodiment given hereinbelow in conjunction with the two figures of drawings which are briefly described as follows.

DETAILED DESCRIPTION OF THE DRAWINGS

Figure 1:
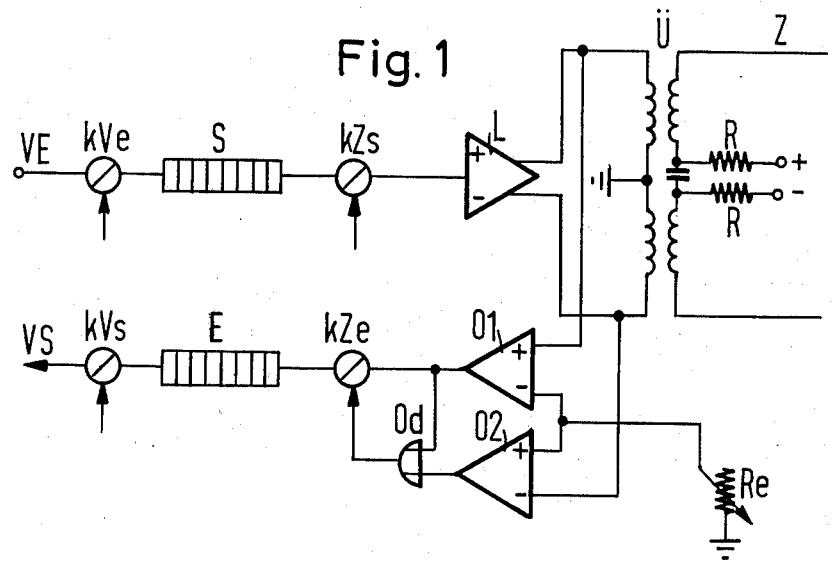
FIG. 1 illustrates in schematic form a time splitting network as employed in the method according to the invention upon the transition from the two-wire subscriber lines to a four-wire line of the concentrator.

For the purpose of explaining the method according to the invention, it is assumed that the units of telecommunications information are pulse-code modulated and are represented by code words of 8 bits each, which are repeated in a 125 microsecond cycle. Thus, the bit rate during the transmission over the PCM time-division multiplex paths of such a telecommunications network is 2.048 Mbits/s. Consequently, a switche $kVe$ disposed in the receiving pair of conductors VE of the four-wire line of a subscriber concentrator (see FIG. 1) is actuated with a switching frequency of 2.048 MHz. The information elements travel over the switch to a register S, which is to be considered as a transmitting register with respect to the two-wire subscriber line Z and in which 8 bits, i.e. one PCM word can be stored.

The information elements are sent from the transmitting register S over the switch $kZs$ to the power driver amplifier L and from there to the two-wire line Z. The switch $kZs$ is actuated at a substantially lower frequency than the switch $kVe$, e.g., at 256 $kHz$. As apparent from a comparison between the lines $a$) and $e$) of FIG. 2, the information bits which are sent to the two-wire line (line $a$) thus have a substantially longer duration than the information bits coming into the subscriber concentrator over PCM time-division multiplex paths (line $e$).

Figure 2:
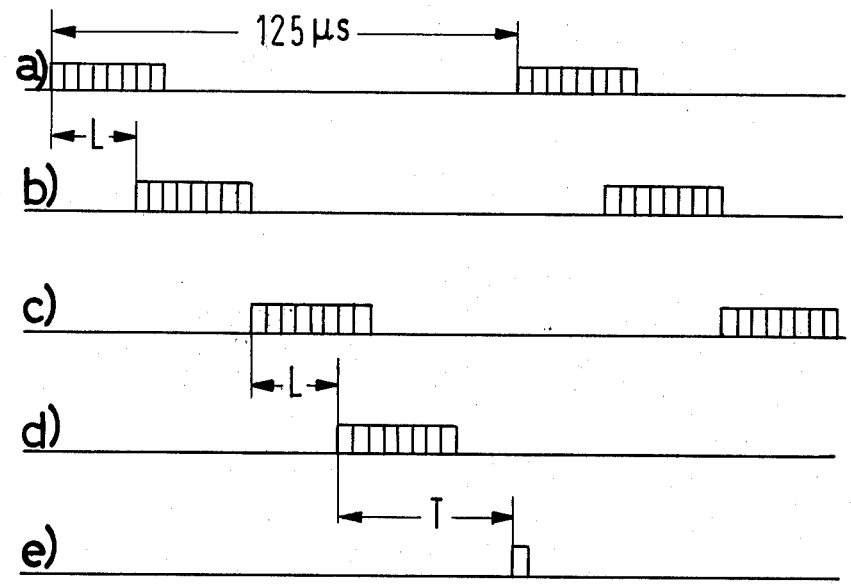
FIG. 2 is a timing diagram illustrating the time behavior during the transmission of information over the two-wire subscriber line.

As apparent from a comparison between lines $a$) and $b$) of FIG. 2, information elements sent to the two-wire length after the distance/velocity lag L arrive at the subscriber set connected to the two-wire subscriber line. Immediately following the complete reception of the information, a unit of information is transmitted in the opposite direction from the subscriber set, whereby the information bits likewise exhibit a pulse duration corresponding to the transmission frequency of 256 kHz (FIG. 2, line $c$)). In this case, too, a distance/velocity lag L is needed until the concentrator is reached (FIG. 2, lines $c$) and $d$)). The units of information travel over the switch $kZe$ to the receiving register E of the concentrator which, likewise, is capable of storing PCM words of 8 bits. The transmitting register S and the receiving register E may, for example, have the same structure as in U.S. Pat. No. 3,258,696.

As shown in FIG. 2, a pulse frame duration of 125 microseconds lapses from the transmission of an information element to the two-wire line Z (line $a$)) until the reception of the information element sent in the opposite direction from the subscriber set (line $d$)), except for the interval of time T. Interval T must be bridged through buffering in the receiving register E until, through actuation of the switch $kVs$, the information elements travel over the pair of conductors VS from the concentrator to a PCM time-division multiplex path. The duration of the information bits transmitted over the two-wire line is selected such that a pulse frame is utilized for the transmissions to the largest extent possible, but that the remaining time interval T is not less than the allowed tolerance time interval between the period of the clock generators in the subscriber sets determining the bit rate and the period of the exchange clock generator determining the exchange clock rate and connected in the terminal exchange to the concentrator of the subscriber set. In this way, optimum conditions are achieved with respect to the damping of the pulses transmitted over the two-wire line Z in case a clock generator of inferior quality is allowed in the subscriber sets.

As mentioned hereinabove, the information bits can be transmitted in the form of potentials that are positive and negative relative to a reference potential. In this way, it is possible to dispense with the transmission of an extra bit for the purpose of identifying the particular start of a word. A comparator is provided for recognizing PCM words coming into the concentrator over the two-wire subscriber line Z. In the illustrated embodiment, the comparator is constructed with the aid of two operational amplifiers 01 and 02, in which the non-inverting input of the operational amplifier 01 is connected to one terminal of the primary winding of the repeater U and the negating input of the other operational amplifier 02 to the other terminal of said primary winding. The other inputs of the two operational amplifiers are applied to a reference potential by connecting them jointly to an adjustable resistor R$e$, which is grounded on the other side.

The output of the operational amplifier 01 is connected to the receiving register E over the switch $kZe$ and, on the other side, to one input of the OR element O$d$, whose output is connected to the control input of the switch $kZe$ mentioned above. The output of the other operational amplifier 02 is connected to the other input of the OR element O$d$. The use of two operational amplifiers as comparators is, for example, also described in "Electronic Circuits Manual" by John Markus, McGraw - Hill Book Company, 1971. This book also gives details about the type of operational amplifiers employed.

If now a PCM word is supplied over the two-wire subscriber line Z, whose first bit is a semi-oscillation corresponding to the binary character 1, a corresponding positive potential is delivered at the output of the operational amplifier 01 which, since the latter travels at the same time over the OR element O$d$ to the control input of the switch $kZe$, is retransmitted over the switch to the receiving register E. If, however, the incoming bit is a semi-oscillation representing the binary character O, then a potential corresponding to this binary character is generated at the output of the operational amplifier 01. In this case, the switch $kZe$ is triggered by the potential appearing at the output of the operational amplifier 02 and travelling over the OR element O$d$ to the control input of the switch, so that the bit can, likewise, travel to the receiving register E. During intervals between two PCM words incoming over the two-wire subscriber line, when the conductors of the line are at reference potential, the switch $kZe$ does not remain conductive and, thus, the state of the potential corresponding to the binary digit 0 is clearly distinguishable from the state of the potential during transmission intervals.

Figure 3:
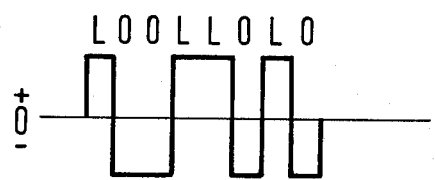
FIG. 3 is a diagram illustrating a PCM word transmittable in accordance with the method of the invention and having positive and negative potentials relative to a reference potential.

FIG. 3 illustrates a binary word containing the binary character L; the word is one having the bit combination L00LL0L0 and comprising 8 bits. FIG. 3 serves to illustrate time conditions, and only the individual bit intervals or PCM word intervals are illustrated without regard to their particular binary representation.

The inventive method is described hereinabove in conjunction with preferred forms of apparatus by which it can be carried out. It is contemplated that other forms of apparatus, as well as other than the described circuit parameters can be used. Further, it is contemplated that the method steps can be modified or changed in a variety of obvious ways while remaining within the scope of the invention as defined by the appended claims.

We claim:

1. A method for transmitting digital data in a time-division multiplex telecommunications network over subscriber lines connecting digitally operating subscriber stations to a subscriber concentrator, comprising the steps of:

transferring data over two-wire subscriber lines in both transmission directions in a time-interleaved manner, alternatively and in the form of data bits, and forming said data bits such that they have a duration substantially equal to the sampling intervals or a plurality thereof, taking into consideration the distance/velocity lags of transmission over said subscriber lines thereby forming the basis for transmission over time-division multiplex paths going out from said subscriber concentrator and coming in thereto, except for a tolerance time interval allowed for the period of the clock generators determining the bit rate in the subscriber sets relative to the period of the exchange clock generator determining the exchange clock rate in the terminal exchange connected to the subscriber concentrator.

2. The method defined in claim 1 wherein said data bits are constituent parts of pulse code words which alternate for both directions of transmission within each sampling pulse frame.

3. The method defined in claim 1 wherein said data bits are delta modulation bits and are transmitted as constituent parts of the bytes which comprise a plurality of data bits corresponding to data sampling values pertaining to the same data time slot in direct timed sequence, and the alternation of which for both directions of transmission occurs within a corresponding plurality of sampling intervals.

4. The method defined in claim 1 wherein said data bits are transmitted in the form of potentials that are positive and negative relative to a reference potential.

* * * * *